(12) United States Patent
Russ et al.

(10) Patent No.: US 8,365,289 B2
(45) Date of Patent: Jan. 29, 2013

(54) SYSTEM AND METHOD FOR PROVIDING NETWORK PENETRATION TESTING

(75) Inventors: Fernando Federico Russ, Buenos Aires (AR); Alejandro David Weil, Buenos Aires (AR); Matias Ernesto Eissler, Buenos Aires (AR); Francisco Javier Dibar, Buenos Aires (AR); Hector Adrian Manrique, Buenos Aires (AR)

(73) Assignee: Core SDI, Incorporated, Boston, MA (US)

( * ) Notice: Subject to any disclaimer, the term of this patent is extended or adjusted under 35 U.S.C. 154(b) by 738 days.

(21) Appl. No.: 12/102,482

(22) Filed: Apr. 14, 2008

(65) Prior Publication Data

US 2008/0256638 A1 Oct. 16, 2008

Related U.S. Application Data

(60) Provisional application No. 60/911,325, filed on Apr. 12, 2007.

(51) Int. Cl.
| | |
|---|---|
| G06F 11/00 | (2006.01) |
| G06F 12/14 | (2006.01) |
| G06F 12/16 | (2006.01) |
| G06F 11/30 | (2006.01) |
| G08B 23/00 | (2006.01) |

(52) U.S. Cl. ............ 726/25; 726/23; 713/188; 714/38.1
(58) Field of Classification Search ...................... 726/25
See application file for complete search history.

(56) References Cited

U.S. PATENT DOCUMENTS

| | | | | |
|---|---|---|---|---|
| 6,311,278 | B1 * | 10/2001 | Raanan et al. | 726/14 |
| 6,584,569 | B2 * | 6/2003 | Reshef et al. | 726/25 |
| 6,889,168 | B2 * | 5/2005 | Hartley et al. | 702/186 |
| 6,952,779 | B1 * | 10/2005 | Cohen et al. | 726/22 |
| 6,993,559 | B2 * | 1/2006 | Jilk et al. | 709/206 |
| 7,152,105 | B2 * | 12/2006 | McClure et al. | 709/224 |
| 7,181,769 | B1 * | 2/2007 | Keanini et al. | 726/23 |
| 7,328,454 | B2 * | 2/2008 | Strickland et al. | 726/25 |
| 7,487,543 | B2 * | 2/2009 | Arnold et al. | 726/24 |
| 7,607,010 | B2 * | 10/2009 | Cavanaugh | 713/165 |
| 7,752,671 | B2 * | 7/2010 | Kotler et al. | 726/25 |
| 7,788,723 | B2 * | 8/2010 | Huddleston | 726/24 |

(Continued)

FOREIGN PATENT DOCUMENTS

WO WO2004031953 A 4/2004

OTHER PUBLICATIONS

Jensen I: "Appscan Developer Edition 1.7 FAQ" Internet Citation, [online] Sep. 5, 2003, pp. 1-14, XP002489815 Retrieved from the Internet: URL: http://www.coadletter.com/article/borcon/files/sefiles/sanctum/AppScan_DE_FAQ.pdf>.

*Primary Examiner* — Carolyn B Kosowski
(74) *Attorney, Agent, or Firm* — Peter A. Nieves; Sheehan Phinney Bass + Green PA

(57) ABSTRACT

A system and method for providing network penetration testing from an end-user computer is provided. The method includes the step of determining at least one of a version of a Web browser of a target computer, contact information associated with an end-user that uses the target computer, and applications running on the target computer. The method also includes the steps of determining exploits that are associated with the running applications and that can be used to compromise the target computer, and launching the exploits to compromise the target computer. Network penetration testing may also be provided by performing the steps of determining an operating system of a target computer, selecting one of a group of modules to use in detecting services of the target computer, and detecting the services of the target computer.

13 Claims, 10 Drawing Sheets

U.S. PATENT DOCUMENTS

| | | | |
|---|---|---|---|
| 7,797,752 B1* | 9/2010 | Vaidya et al. | 726/27 |
| 8,020,192 B2* | 9/2011 | Wright et al. | 726/1 |
| 8,127,353 B2* | 2/2012 | Rittermann | 726/22 |
| 2001/0034847 A1* | 10/2001 | Gaul, Jr. | 713/201 |
| 2003/0009696 A1* | 1/2003 | Bunker et al. | 713/201 |
| 2003/0212779 A1* | 11/2003 | Boyter et al. | 709/223 |
| 2004/0088581 A1* | 5/2004 | Brawn et al. | 713/201 |
| 2004/0250115 A1* | 12/2004 | Gemmel et al. | 713/201 |
| 2005/0005152 A1* | 1/2005 | Singh et al. | 713/200 |
| 2005/0138426 A1* | 6/2005 | Styslinger | 713/201 |
| 2005/0216557 A1* | 9/2005 | Ohwa et al. | 709/204 |
| 2006/0195588 A1* | 8/2006 | Pennington et al. | 709/227 |
| 2007/0143851 A1* | 6/2007 | Nicodemus et al. | 726/25 |
| 2007/0192855 A1* | 8/2007 | Hulten et al. | 726/22 |
| 2008/0056249 A1* | 3/2008 | Ocko et al. | 370/389 |
| 2008/0120722 A1* | 5/2008 | Sima et al. | 726/25 |
| 2008/0209567 A1* | 8/2008 | Lockhart et al. | 726/25 |
| 2010/0235920 A1* | 9/2010 | Kotler et al. | 726/25 |

* cited by examiner

SYSTEM AND METHOD FOR PROVIDING NETWORK PENETRATION TESTING

CROSS-REFERENCE TO RELATED APPLICATION

This application claims priority to copending U.S. Provisional Application entitled, "SYSTEM AND METHOD FOR PROVIDING NETWORK PENETRATION TESTING," having Ser. No. 60/911,325, filed Apr. 12, 2007, which is entirely incorporated herein by reference.

FIELD OF THE INVENTION

The present invention relates to analyzing computer system security by compromising the security in a systematic manner.

BACKGROUND OF THE INVENTION

Computer systems that are connected to a computer network, such as the Internet, must employ security measures to prevent unauthorized users from accessing these systems. The security measures must be properly designed and implemented in order to prevent unauthorized access. However, it is difficult to evaluate the effectiveness of such security measures, particularly in view of the increasing sophistication of techniques used to gain unauthorized access to computer systems.

The effectiveness of the security measures of a computer system may be evaluated by performing a computer security audit in which various aspects of computer security are analyzed and evaluated. The security audit may include a penetration test, which is a process by which a security auditor attempts to gain unauthorized access to the computer system.

Conventionally, a penetration test is performed using a multitude of ad hoc methods and tools, rather than according to a formalized standard or procedure. A typical penetration test includes the following stages: 1. Information gathering: the security auditor gathers technical details about the target system and information regarding the owner of the target system. 2. Information analysis and planning: The auditor analyzes the information to plan an overall approach by which to perform the penetration testing. This tends to be a difficult and time consuming task and requires experienced and knowledgeable personnel having a highly specialized skill base. 3. Vulnerability detection: The auditor searches the target system for security vulnerabilities based on the top-level plan developed in the information analysis and planning stage. Security vulnerabilities include, for example, system misconfigurations that enable an unauthorized user to gain access using a known series of steps. The vulnerability search may be performed using an automated vulnerability scanner, which is a software package that determines whether certain known flaws may be used to gain unauthorized access to the target. Manual vulnerability scanning also may be performed to probe for common vulnerabilities that, for various reasons, may have been missed by an automated scanner. However, such vulnerability scanning techniques merely list the vulnerabilities, rather than actually attempt to exploit them. The automated and manual vulnerability searches may be supplemented by research performed by the security auditor to determine previously unknown vulnerabilities. Such research typically is performed using a copy (also called a mirror) of the software application being probed and/or the associated hardware.

Another stage in a typical penetration test includes: 4. Compromising and accessing the target system: The auditor attempts to compromise the target system based on the results of the vulnerability detection stage using publicly available or custom-developed programs. Publicly available programs designed to exploit system vulnerabilities tend to be unreliable and require testing and customization before use. In general, exploiting detected vulnerabilities, regardless of the tools being used, requires experienced and knowledgeable personnel having a highly specialized skill base. In addition, a considerable laboratory infrastructure may be required to develop and test vulnerability exploitation tools, particularly when the target system employs a number of different operating system platforms. 5. Analysis and reporting: This stage includes consolidating and presenting the information obtained during the previous stages and developing recommendations for remedying the security vulnerabilities identified during the penetration test. Manually maintaining a record of all of the actions taken and information gathered during testing is extremely time consuming and prone to error. Moreover, the preparation of complete and accurate records is subject to the discipline of the personnel conducting the test. 6. Clean up: The compromising and accessing stage typically results in significant changes being made to the target system. In the clean up stage, the auditor returns the system to its original configuration. To perform a successful clean up, a detailed and exact list of all actions performed during testing must be maintained, yet there are only rudimentary tools available for maintaining such information.

Client-side exploits constitute a special family of exploits that are used for attacking client applications. As an example, in the execution of many protocols, there are two entities that participate, namely, a client and a server where typically the server provides a centralized service to many clients (e.g., Web browsers are clients that connect to Web applications (hosted in web servers) for downloading content, mail clients connect to mail servers to download or send mails, etc.). Certain vulnerable client applications are exploitable, this means that one could develop some exploit code that is somehow uploaded to a server that provides service to these clients and can be used to successfully attack this application (e.g., to take control of the computer system running this application). For example, in the case of an email application exploit, the penetration tester typically finds out what email client is being used by an entity in the target organization, sends an email to this entity, this email containing some exploit code, and compromises the computer that receives this email.

Unfortunately, the process of executing steps 1-6 above in order to execute a penetration test as fast as possible, without disrupting services, and focusing on the objective of the test (as described by the contractor of the audit) requires great skill, and is very difficult. In view of the shortcomings discussed above, there is a need for a system and method for performing client side penetration testing employing a computer system compromise that takes an entirely fresh approach and overcomes the drawbacks of the conventional techniques.

SUMMARY OF THE INVENTION

Embodiments of the present invention provide a system and method for providing network penetration testing. Briefly stated, one embodiment of such a method, among others, can be broadly summarized by the following steps: determining at least one of a version of a Web browser of a target computer, contact information associated with an end-user that uses the target computer, and applications running on the target computer; determining exploits that are associated with the running applications and that can be used to compromise the target computer; and launching the exploits to compromise the target computer. Network penetration testing may also be provided by performing the steps of: determining an operating system of a target computer; selecting one of a group of modules to use in detecting services of the target computer; and detecting the services of the target computer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method provides a network penetration-testing framework that allows a testing end-user to test for network vulnerabilities. It should be noted that the present system and method may be used for network penetration testing, an example of which includes the testing of client-side applications, such as, but not limited to, email clients, browsers, word processors, or other applications that are run on personal computers, as opposed to on a server. Specifically, it should be understood that client-side penetration testing is not limited to auditing the security of client-server protocols, but more generally to testing the security of the workstations run by the members of an organization (as opposed to Web servers), e.g. desktop computer systems or portable computer systems.

A client-side security audit, in accordance with the present invention, will test the security of these computer systems by probing them for vulnerable applications and taking advantage of these to compromise them. Examples of non-client-server applications are word processors, image viewers, or any application that constitutes Microsoft Office®. The present penetration tester takes advantage of a vulnerability in one of these applications and produces a specially-crafted document (e.g., word document, image, etc.) such that when the document is opened with a vulnerable version of the application, this action will exploit the vulnerability and the penetration tester will have compromised the underlying computer system.

An embodiment of this invention leverages the knowledge required to choose what functionalities to run and the parameters to use by taking an objective and computing a plan that will have this objective achieved. To do this, the present systems and methods combine acquired information regarding target systems (e.g., computers) with knowledge of available modules (exploit and information gathering modules), to deduce a best possible action path, wherein an action path is a sequence of module executions that end with achieving an objective.

Figure 1:
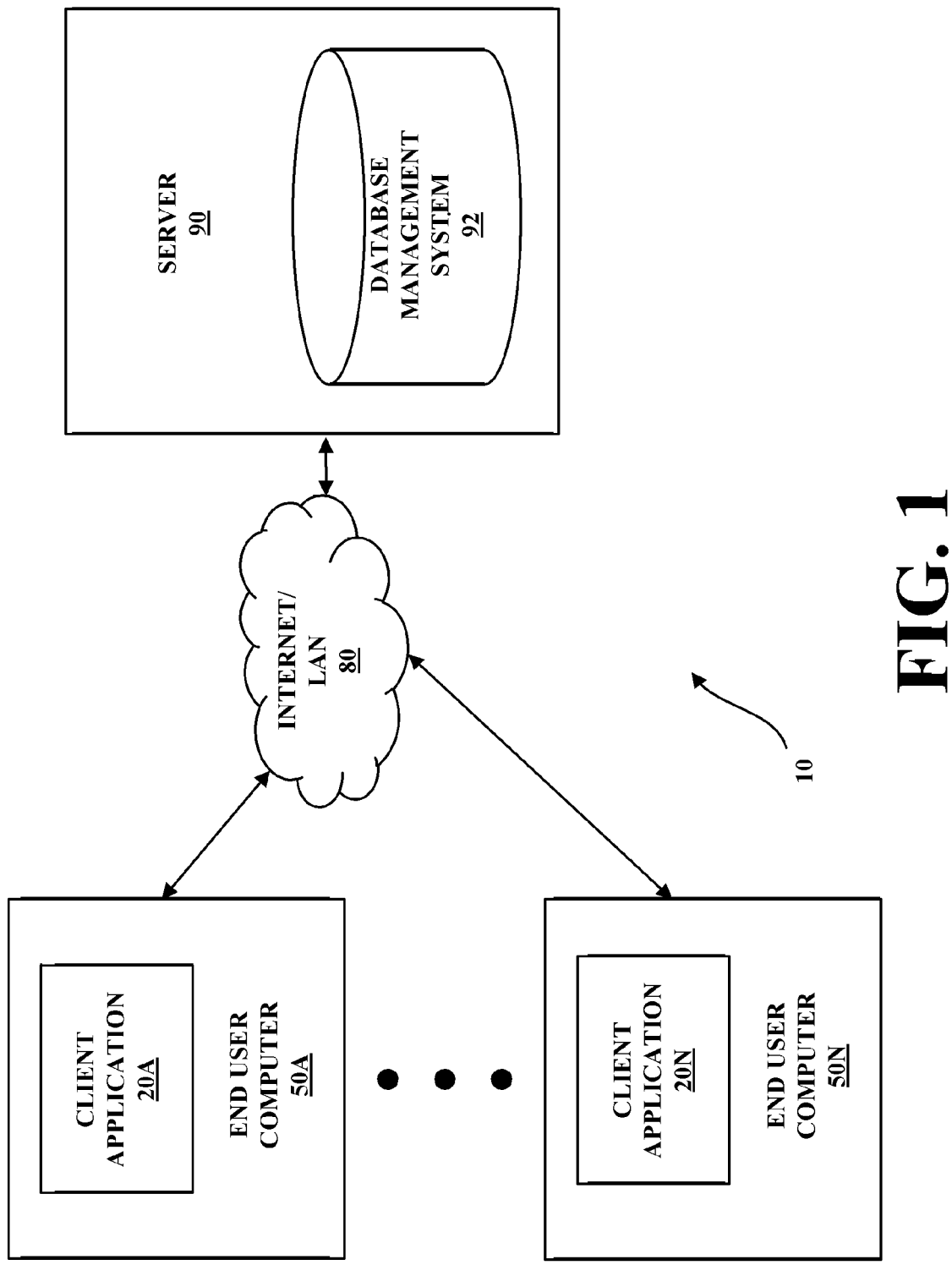
FIG. 1 is a schematic diagram illustrating an example of a network in which the present client-side application penetration-testing framework may be provided.

FIG. 1 is a schematic diagram illustrating an example of a network in which the present client-side application penetration-testing framework may be provided. As shown by FIG. 1, the network 10 contains a series of end-user computers 50A-50N (hereafter 50) having client-side applications 20A-20N stored therein. The end-user computers 50 communicate with a server 90 via the Internet or a Local Area Network (LAN) 80. The end-user computers 50 act as clients in a client/server relationship, where the server 90 may provide a centralized service to many clients 50. As an example, Web browsers are clients that connect to Web applications for downloading content. Such content may be located within a storage device, such as the database management system 92 hosted in the server 90. In addition, mail clients connect to mail servers to download or send mail. Of course, there are many other examples of client/server relationships.

Figure 2:
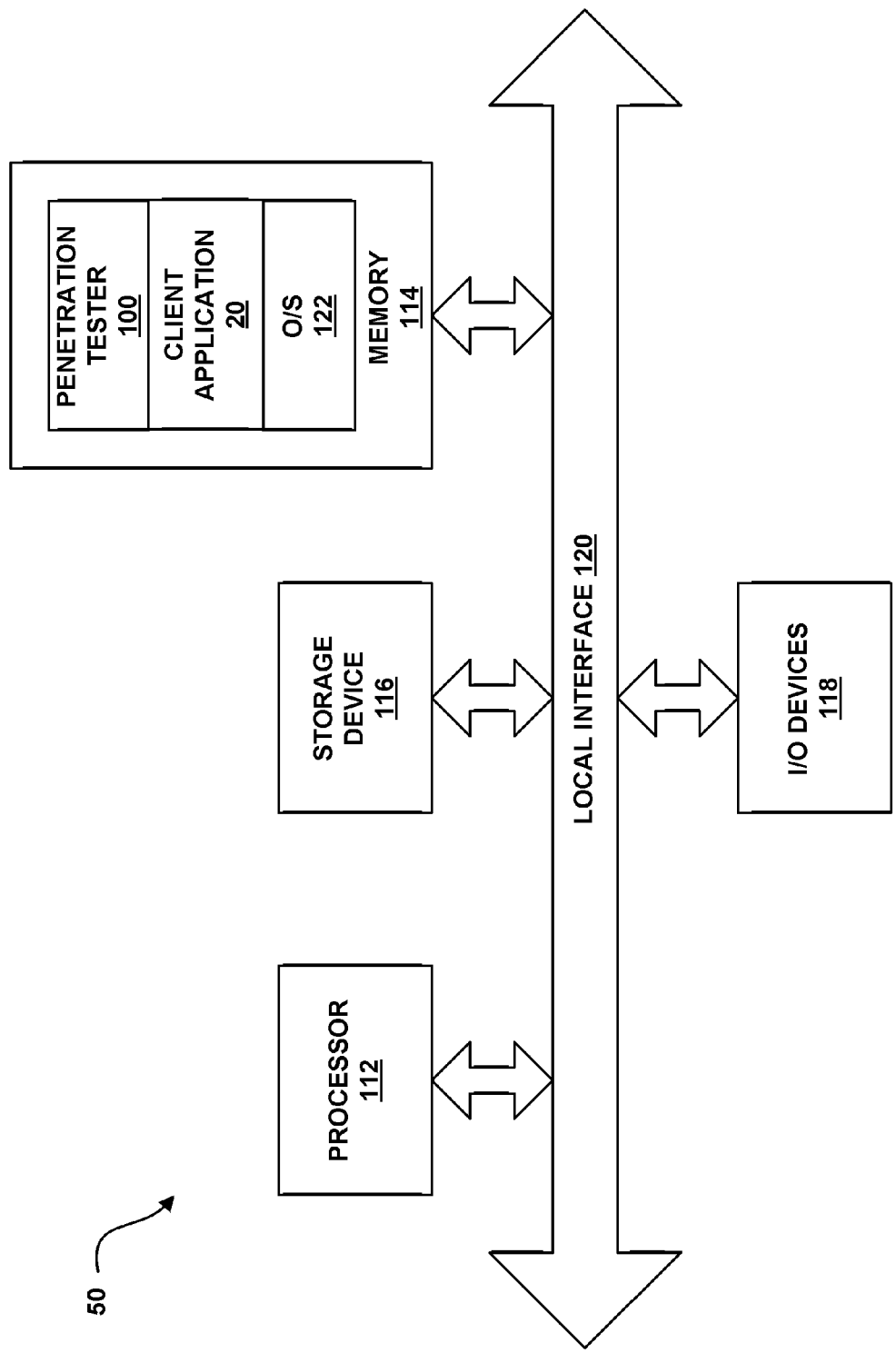
FIG. 2 is a block diagram further illustrating the end-user computer of FIG. 1, in which a client-side penetration tester may be located.

FIG. 2 is a block diagram further illustrating the end-user computer 50 of FIG. 1, in which a client-side penetration tester 100 may be located. The client-side penetration tester 100 is used to determine if there are vulnerabilities to a client application 20. It should be noted that the penetration tester 100 of the present invention can be implemented in software (e.g., firmware), hardware, or a combination thereof. In the currently contemplated best mode, as mentioned in the description of FIG. 2, the penetration tester 100 is implemented in software, as an executable program, and is executed by a special or general purpose digital computer (e.g., the end-user computer 50), such as a personal computer (PC; IBM-compatible, Apple-compatible, or otherwise), workstation, minicomputer, or mainframe computer. Further description of the penetration tester 100, and interaction therewith is provided below.

Generally, in terms of hardware architecture, as shown in FIG. 2, the end-user computer 50 may includes a processor 112, memory 114, storage device 116, and one or more input and/or output (I/O) devices 118 (or peripherals) that are communicatively coupled via a local interface 120. The local interface 120 can be, for example but not limited to, one or more buses or other wired or wireless connections, as is known in the art. The local interface 120 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 112 is a hardware device for executing software, particularly that stored in the memory 114. The processor 112 can be any custom made or commercially available processor, a central processing unit (CPU), an auxiliary processor among several processors associated with the computer 50, a semiconductor based microprocessor (in the form of a microchip or chip set), a macroprocessor, or generally any device for executing software instructions.

The memory 114 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 114 may incorporate electronic, magnetic, optical, and/or other types of storage media. Note that the memory 114 can have a distributed architecture, where various components are situated remote from one another, but can be accessed by the processor 112.

Software within the memory 114 may include one or more separate programs, each of which comprises an ordered listing of executable instructions for implementing logical functions of the system, as described below. In the example of FIG. 2, the software in the memory 114 defines the penetration tester 100 functionality, in accordance with the present invention. In addition, the memory 114 may contain an operating system (O/S) 122 and the client application 20. The operating system 122 essentially controls the execution of computer programs and provides scheduling, input-output control, file and data management, memory management, and communication control and related services.

The penetration tester 100 may be provided by a source program, executable program (object code), script, or any other entity comprising a set of instructions to be performed. When a source program, then the program needs to be translated via a compiler, assembler, interpreter, or the like, which may or may not be included within the memory 114, so as to operate properly in connection with the O/S 122. Furthermore, the penetration tester 100 can be written as (a) an object oriented programming language, which has classes of data and methods, or (b) a procedure programming language, which has routines, subroutines, and/or functions.

The I/O devices 118 may include input devices, for example but not limited to, a keyboard, mouse, scanner, or microphone. Furthermore, the I/O devices 118 may also include output devices, for example but not limited to, a printer, display, etc. Finally, the I/O devices 118 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the penetration tester 100 is implemented in software, as is shown in FIG. 2, it should be noted that the penetration tester 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The penetration tester I00 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
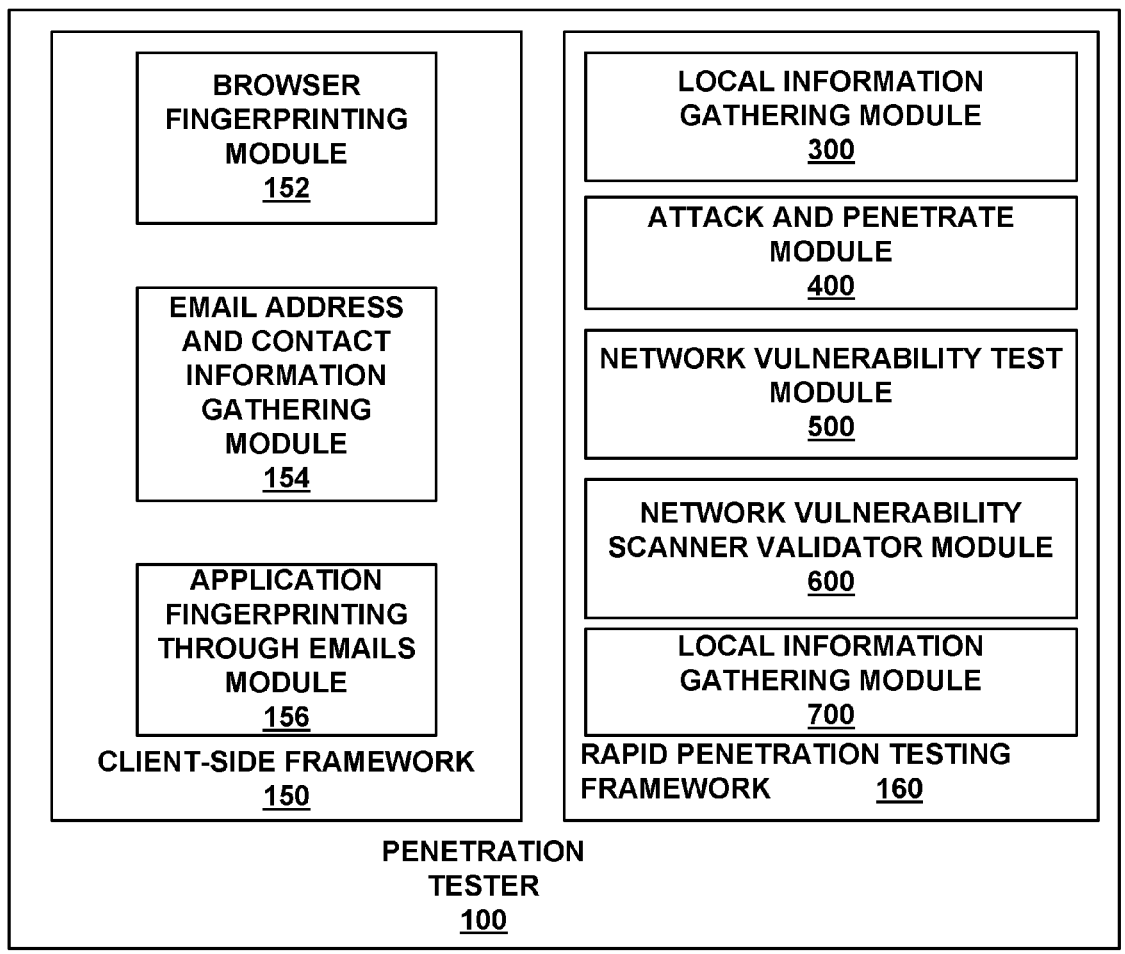
FIG. 3 is a block diagram further illustrating the penetration tester of FIG. 2.

Functionality of the penetration tester 100 may be divided into two categories. A first category is a client-side framework 150 and a second category is a rapid penetration testing framework 160. Each of the frameworks 150, 160 is illustrated by the block diagram of FIG. 3. The client-side framework 150 contains a browser fingerprinting module 152, an email address and contact information gathering module 154, and an application fingerprinting through emails module 156. The rapid penetration testing framework 160 contains an information gathering module 300, an attack and penetrate module 400, a network vulnerability test module 500, and a network vulnerability scanner validator module 600. Each of the above modules is described in detail hereinbelow.

Figure 4:
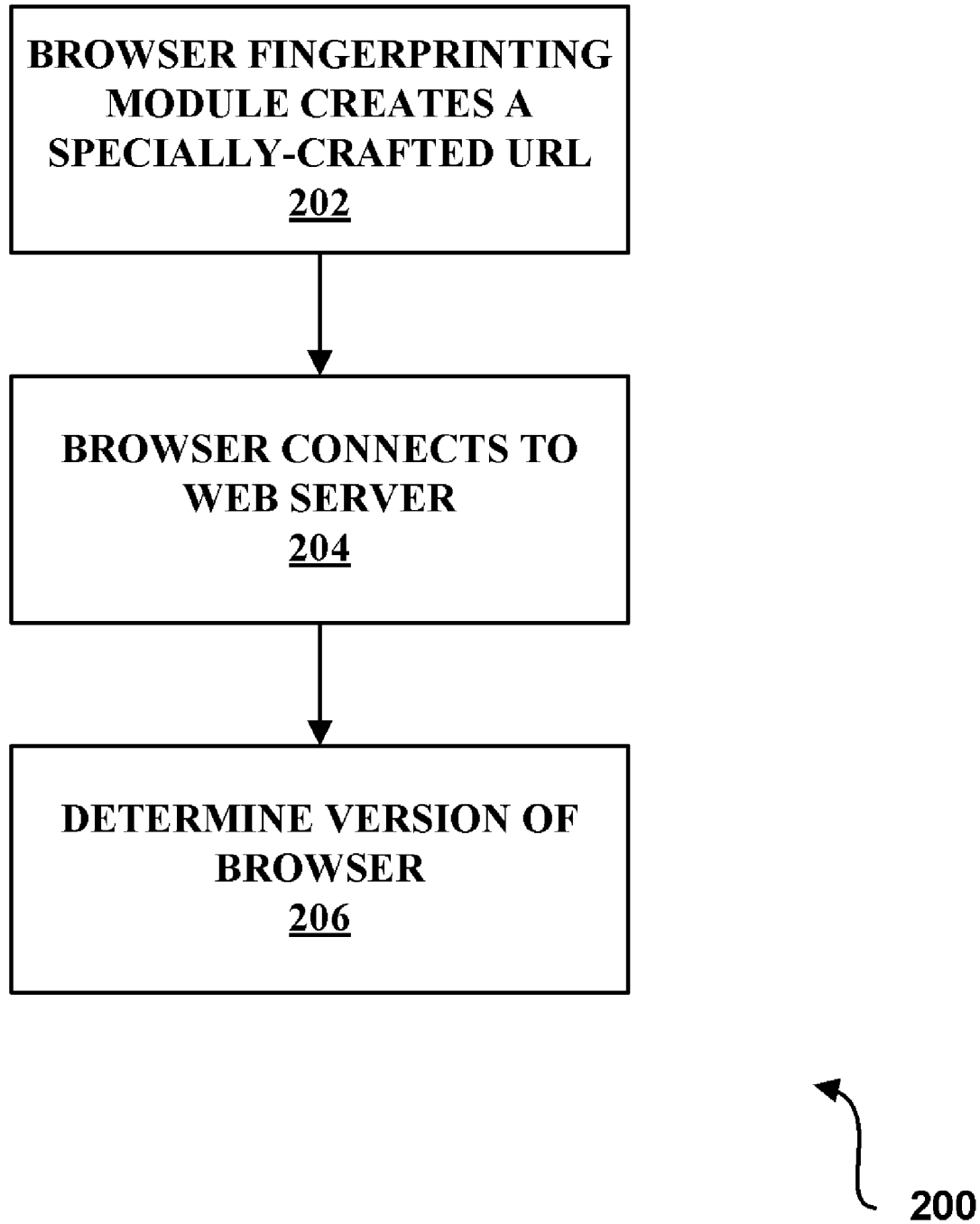
FIG. 4 is a flow chart further illustrating steps taken by a browser fingerprinting module.

FIG. 4 is a flow chart 200 further illustrating steps taken by the browser fingerprinting module 152. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Referring to FIG. 4, the browser fingerprinting module 152 creates a specially-crafted uniform resource locator (URL) which points to the location of a Web server controlled by the penetration tester 100 (block 202). It should be noted that the URL may be a text string.

Once the URL is rendered by a browser located on an end-user computer 50, the browser will connect to the Web server controlled by the penetration tester 100, such as the server 90 of FIG. (block 204), and execute the code that the penetration tester 100 had previously stored in the previously mentioned location of the Web server. From this browser-server interaction, a version of the browser is determined (block 206), the process of which is described below.

Although Web browsers follow the same protocols (which may include several protocols and several versions of each protocol), the different interpretations and deviations of this protocol allow the browser fingerprinting module 152 to compute the Web browser version from this interaction. Specifically, when the Web browser connects to the Web server 90, it will make a request and provide certain information to the Web server 90 (for example, a header for the request) and values for certain parameters.

A list of expected values of these parameters for each Web browser version is stored in the storage device 1 6. Given a request from the browser, the browser fingerprinting module 152 will fingerprint the Web browser according to a probability distribution. For example, the distribution can be computed according to the biggest number of parameters matched. It should be noted that a skilled penetration tester can figure out how to improve this using other standard probability distributions. It should be noted that the browser fingerprinting module 152 is capable of being updated, so that new versions of Web browsers can also be fingerprinted.

Referring now to the email address and contact information gathering module 154, one of the tasks that might lead to compromise an organization through client-side exploits is to obtain the email addresses of its members, or in any case, usernames for applications used by its members (e.g., messenger services such as MSN, Google talk, Skype, etc.). The email address and contact information gathering module 154 provides three different modules for performing this task.

A first module of the email address and contact information gathering module 154 provides the capability of deciding, by querying a Simple Mail Transfer Protocol (SMTP) server, an example of which may be the server 90 of FIG. 1, which of a list of potential email addresses hosted in this server are valid. To determine which of the list of potential email addresses hosted in the server are valid, it should first be noted that the sending and reception of emails is typically handled by a pair of servers, namely, the SMTP servers and the Post Office Protocol version 3 (POP3) servers. An outgoing email POP3 server, which manages the email of the sender, interacts with the SMTP server of the recipient and, at the end of the interaction, the email is received by the server of the recipient. The owner of this email account then will connect to his server through his email client and download the emails. The information gathering module 154 interacts with an SMTP server in order to detect the email addresses that the SMTP server hosts. At the end of the execution of the first module, a list of emails that are hosted on this server is derived. Such a list may include the emails of people that work for the organization that is being penetration-tested.

To understand how the first module works, it is important to know that the outgoing mail servers can answer, one at a time, if an email address is functional or void. As an example, after a first query it can be determined that tom@organization.com is a valid email and after a second query it can be determined that bob@organization.com is not a valid email. The first module requires two inputs: the SMTP server address (e.g., "smtp.organization.com" in the above example) and a list of potential usernames (e.g., tom and bob in the above example). For exemplary purposes, it should be noted that, to provide the list of usernames there are two methods available: either the list can be provided as a comma-separated sequence of usernames, or in a compressed form by using regular expressions. As an example, tom.[a-z] is equivalent to the usernames tom.a, tom.b, . . . , tom.z.

A second module of the email address and contact information gathering module 154 automates browsing Web pages of organizations to obtain email addresses of the organization. This process is automated by browsing the complete Web page tree, detecting email addresses, and storing them. While Web "crawling" is performed in a traditional manner, the information gathering module 154 concatenates the "crawling" with an email recognition command. As is known by those having ordinary skill in the art, email recognition from text strings is a standard task (e.g., an email client will check if the email addresses of the recipients are well formed) and this might be done by looking for a regular expression that describes a string with three parts, namely, an alpha-numeric string, concatenated with @, concatenated with another alphanumeric string, concatenated a suffix such as, com, org, edu, or other suffixes. An example format follows:

[a-z,A-Z,0-9,.-_]@[a-z,A-Z,0-9,-_].[com, org, mil, edu].[ar, br, cl, cn, ru]

Once a computer in the target organization is compromised, or a computer used by a member of the organization, the penetration tester 100 can use the compromise to learn information about the organization. One of the tasks that the attacker will do is download the computer contacts, in order to compromise the computers underlying these contacts. As an example, say that the penetration tester 100 compromised a computer using MSN messenger's exploit, so that probably everybody else in the organization, and in particular the MSN contacts of the compromised computer, is liable to the same exploit. Hence, it would be beneficial for the penetration tester 100 to obtain these contacts.

As a result of the abovementioned, a third module of the email address and contact information gathering module 154 automatically browses the file system of the compromised computer and downloads contact lists, such as, for example, email address books, PDA address books, etc. The third module then consolidates this information in a database that can be used later by the other modules of the penetration tester 100. In accordance with one exemplary embodiment of the invention, the contact information can be viewed through a user interface provided by the penetration tester 100 on the end-user computer 50.

It should be noted that in accordance with one exemplary embodiment of the invention, the client-side framework 150 provides an interface for using the abovementioned contact information as the parameters of exploit modules. An end-user using an end-user computer 50 could select all of the email addresses found by one of the abovementioned modules and command the penetration tester 100 to attempt to exploit the email addresses one by one until one exploit is successful.

The application fingerprinting through emails module 156 of the client-side framework 150 allows for a determination to be made as to what applications are running on a target computer, given the IP address and network connectivity of the target computer. Herein, the IP and network connectivity is from the end-user computer 50 having the penetration tester 100 to the computer being tested. To determine what applications are running on a target computer, a specially crafted email containing computer code is sent to the target computer. This email might contain a placeholder for an image, or enriched text, or HTML code that is hosted in a Web server controlled by the penetration tester 100, so that when the email is opened this will cause the email client to fetch this content and present it, possibly using other applications in the workstation, for the presentation. Thus, the image or text may be rendered by a Web browser, and may take the form of, for example, JavaScript or hypertext markup language (HTML) code. In any case, the way in which the application connects to the Web browser to request this information will give away the version of the application. This procedure is the same as the Web browser fingerprinting module, in case we are fingerprinting a Web browser. It should be noted that one having ordinary skill in the art can generalize the browser fingerprinting example to cover other applications.

Examples of applications that may be running on the target computer may be, for example, the email client (e.g., Outlook, Outlook Express, Mozilla Thunderbird, Mac OSX Mail, Opera), the version of the email client, the Web browser (e.g., Internet Explorer, Mozilla Firefox, Safari, Opera), and the version of the Web browser.

The application fingerprinting through emails module 156 uses, as a sub-procedure, the browser fingerprinting module 152. In fact, the application fingerprinting through emails module 156 allows a user of the penetration tester 100 to fingerprint any application that is used by the email client to read emails.

Having described the client-side framework 150 of the penetration tester 100, the following is a description of the rapid penetration testing (RPT) framework 160 of the penetration tester 100. RPT modules, as described in detail hereinafter, are designed to facilitate and ease the work that would be performed by an end-user performing a penetration attack, by taking care of the many choices that the end-user would have to make through a penetration test. When performing a penetration test, the penetration tester 100, which assists the end-user performing the penetration attack, goes through the steps of information gathering, attack and penetrate, pivot and repeat, or finally reporting. The information gathering, and attack and penetrate steps are the ones that can be carried out in several variations, and selecting the right order is crucial for having a quick and successful penetration test.

The RPT framework 160 includes several modules that can be used for gathering information or attacking computer hosts. The RPT framework 160 modules include an information gathering module 300, an attack and penetrate module 400, a network vulnerability test module 500, a vulnerability scanner validator module 600, and a local information gathering module 700. The information gathering module 300, the attack and penetrate module 400, and the network vulnerability test module 500 require as input the range of IP addresses of target computers, defining a few options, as described hereinafter, and will fulfill the actions of information gathering, or attacking and penetrating within the quickest possible manner. The vulnerability scanner validator module 600 requires as input the report produced by a vulnerability scanner (i.e., comprising a list of computer systems, their IP address, and the vulnerabilities found by the scanner). It should be noted that one having ordinary skill in the art would know the functionality of a vulnerability scanner.

Figure 5:
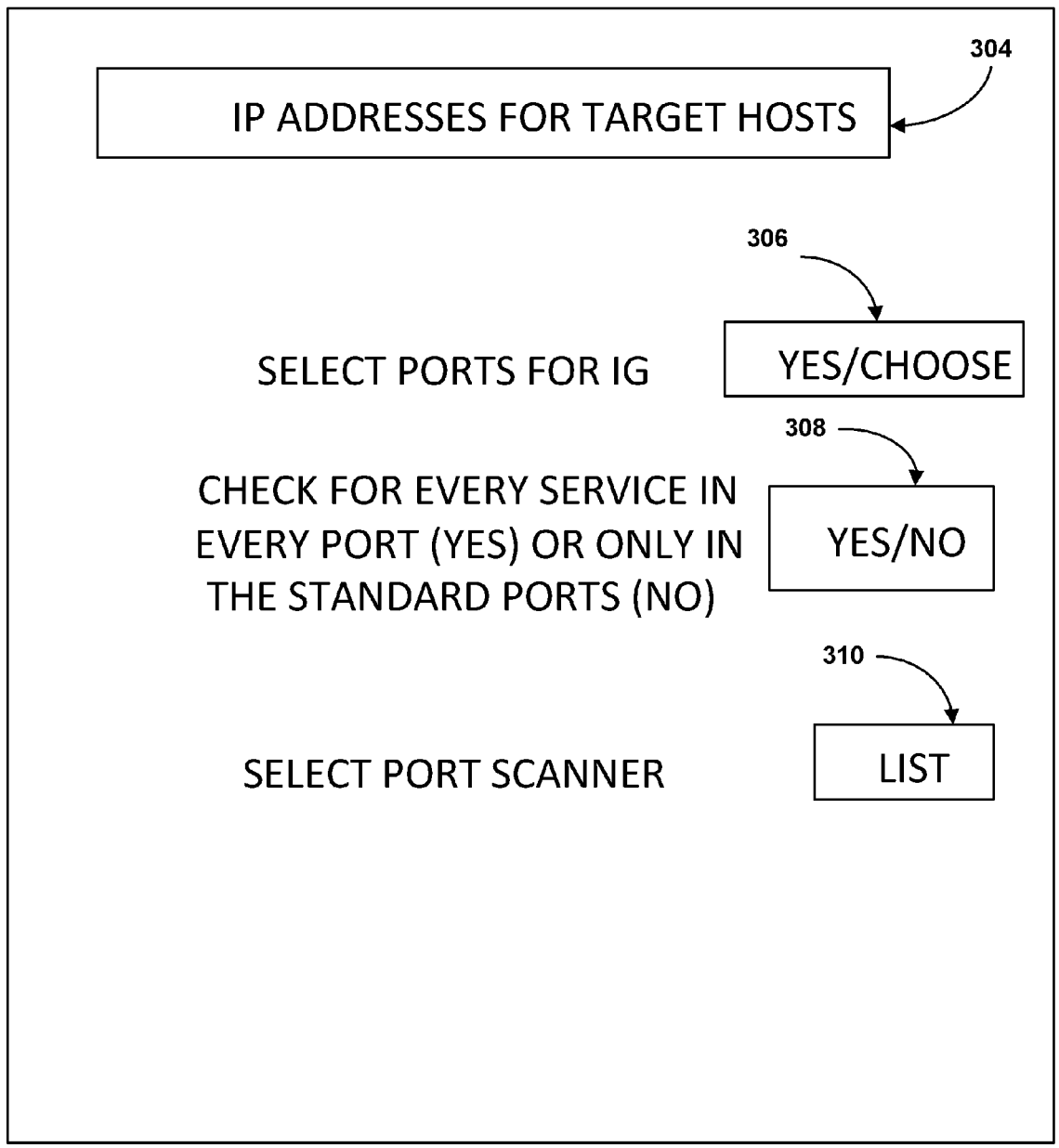
FIG. 5 is a sample of a configuration pane used by an information gathering module for the gathering of information for rapid penetration testing.

FIG. 5 is a sample of a configuration pane 302 used by the information gathering module 300 for gathering of information for rapid penetration testing. An end-user that is performing penetration testing interacts with the configuration pane 302 and other panes described herein. The end-user selects a set of IP addresses of computers to be tested 304. The IP addresses may either be individually provided by the end-user, listed for selection by the penetration tester 100, or a range of IP addresses may be selected by the end-user.

The end-user then selects whether he wants a fast information gathering or a custom information gathering. The end-user may make this selection by selecting a yes option for selecting ports of information gathering or selecting a choose option 306. For a custom information gathering the end-user also defines what ports of the computer being tested should be targeted. It should be noted that the end-user may select to test all ports 308. In addition, the end-user may select to use a specific port scanner of the penetration tester 100 or all port scanners available 310. As is known by those having ordinary skill in the art, a port scanner is capable of determining which ports of a computer being tested are open.

Figure 6:
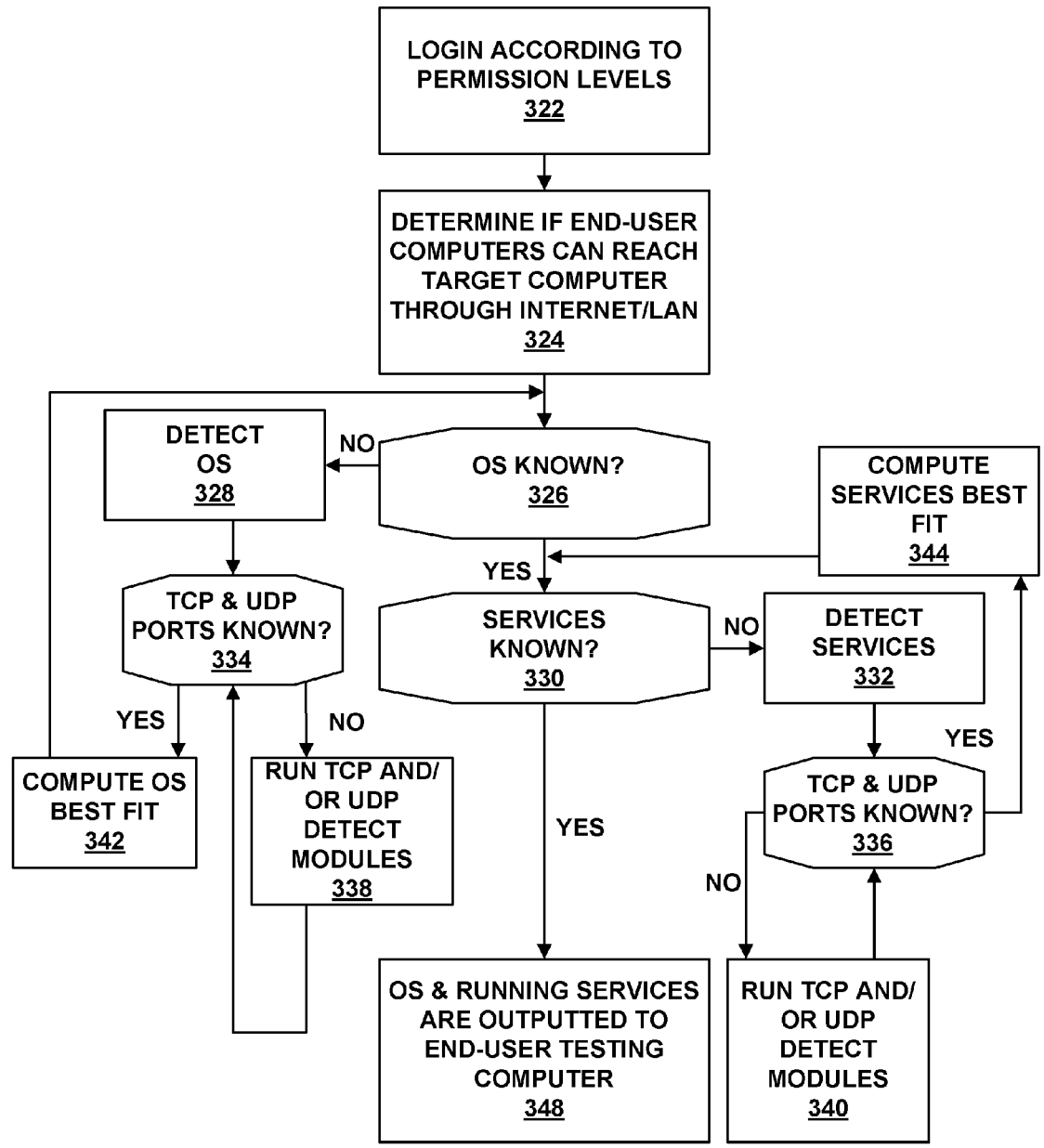
FIG. 6 is a flow chart illustrating steps taken during a run of the information gathering module of FIG. 5, against a single target computer.

FIG. 6 is a flow chart 320 illustrating steps taken during a run of the information gathering module against a single target computer. For purposes of this example, the fast information gathering option is selected, the option to check for every service in every port is selected, and the option to use all port scanners is selected. Upon starting the information gathering module 300 the information gathering module requires the end-user to login (block 322). During the login, a determination is made as to whether the end-user has permission to run the penetration tester 100. Levels of access to the penetration tester 100 may be predefined.

If the end-user is allowed access to the penetration tester 100 a determination is then made as to whether the end-user computer 50 can reach a target computer through the Internet/LAN 80 (block 324). If the target computer can be reached by the end-user computer 50, the information gathering module 300 determines whether it knows the operating system (OS) of the target computer (block 326). It should be noted that the target computer may be a normal computer or a virtual machine.

The information gathering module 300 also determines whether it knows running services on the target computer (block 330). If both the OS and the running services of the target computer are known, the OS and running services are outputted for use by the penetration tester 100. Specifically, either the end-user or the attack and penetrate module might use this information to determine which exploit module to execute next. Alternatively, if the OS is not known, an OS detect module may be run (block 328) to determine the OS. In addition, if the running services are not known, a services detect module may be run (block 332) to determine what services are being run on the target computer.

It should be noted that upon running either the OS detect module or the services detect module, each module will check to see if the open transmit control protocol (TCP) ports and the open user datagram protocol (UDP) ports are known by the penetration tester 100. In the case that there are any TCP or UDP ports that are unknown, TCP detect and/or UDP detect modules may be run to determine the same (block 334).

Once the open TCP ports and UDP ports are known, the OS detect module can compute a best possible fit for the OS of the target computer (block 336). In addition, the services detect module can compute a best possible fit for running services (block 338). In both OS detection and running service detection, computation is performed by matching the set of open ports with a predefined list stored within the storage device 116 of the end-user computer 50. Specifically, the predefined list contains stored therein a series of operating systems and TCP and UDP ports open for such operating systems. By matching open TCP and UDP ports to the list, the OS and version of OS, of the target computer can be determined. A similar process may be used for determining services being run on the target computer. As an example, assume that the first open port that is discovered is TCP port 139. Since this port is traditionally assigned to the NetBIOS service, which runs in Windows systems, a NetBIOS name table enumerator module may be used in order to detect the OS of the target computer.

Figure 7:
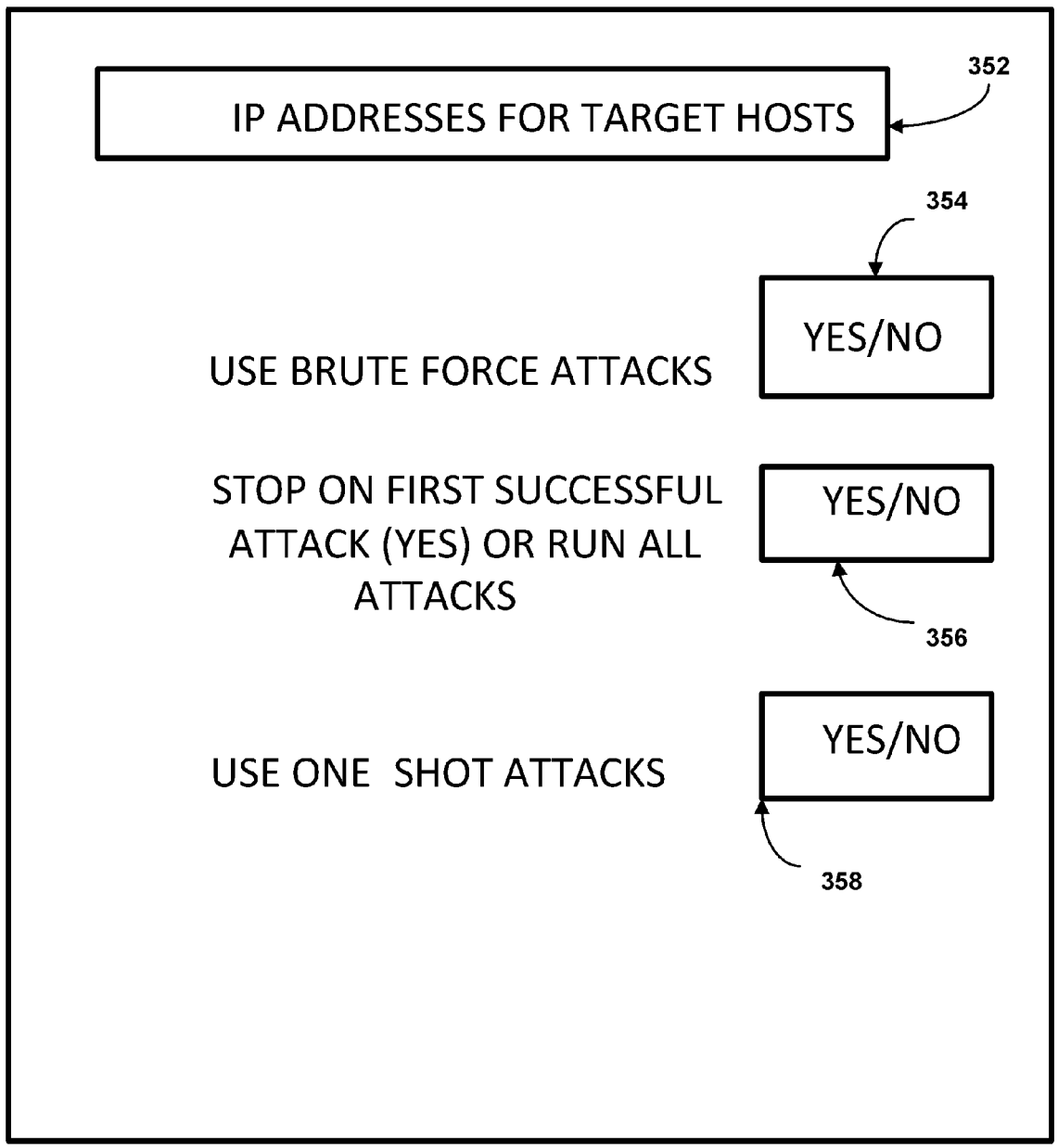
FIG. 7 is a sample configuration pane that may be used to interact with an attack and penetrate module.

The following further describes the attack and penetrate module 400 of the rapid penetration testing framework 160. FIG. 7 is a sample configuration pane 350 that may be used to interact with the attack and penetrate module 400. As shown by FIG. 7, an end-user testing a target computer may select a set of IP addresses of target computers 352. The IP addresses may either be individually provided by the end-user, listed for selection by the penetration tester 100, or a range of IP addresses may be selected by the end-user.

One option of the configuration pane 350 is whether to execute brute-force attacks against the target computer or not 354. In addition, the end-user may select whether he wants the brute-force attacks run against each computer to stop once the computer is compromised 356. If more than one IP address was previously selected, a brute-force attack is launched for each computer at the IP address. If the end-user did not select to have the brute-force attacks stop once the computer is compromised, the attack and penetrate module 400 will continue sending all possible brute-force attacks and thus discover as much exploitable vulnerability associated with the target computer as possible.

The configuration pane 350 also provides an option for the end-user to select whether one-shot attacks will be used 358. One-shot attacks are attacks that might crash a service, or even the computer under attack, and thus the end-user testing the target computer might not want to use these attacks. As an example of a one-shot attack, there is a buffer overflow exploit module for the snmpXDmid daemon that has a probabilistic nature. Specifically, the exploit will effectively compromise the server if a given parameter has a certain value, but might cause the service to crash otherwise. The snmpXDmid is a service present in Sun Solaris 7 and 8, and it does not fork and it is not restarted after a crash, so the exploit module cannot be executed again until it functions correctly.

Figure 8:
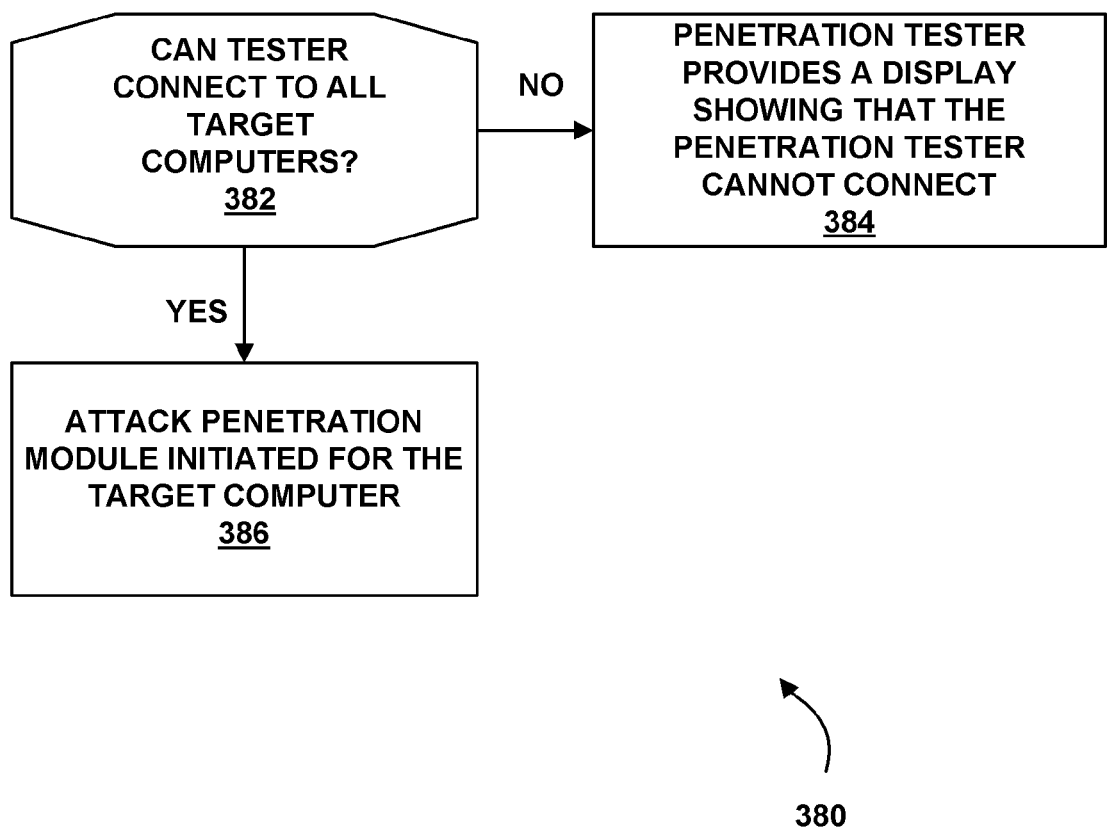
FIG. 8 is a flow chart illustrating steps taken by the attack and penetrate module of FIG. 7 when run against multiple different target computers, where each target computer has a different IP address.

FIG. 8 is a flow chart 380 illustrating steps taken by the attack and penetrate module 400 when run against multiple different target computers (N), where each target computer has a different IP address. The penetration tester 100 first determines whether it can connect to all of the target computers (N) (block 382). If the penetration tester 100 cannot connect to all of the target computers (N) the penetration tester 100 provides a display showing that the penetration tester 100 cannot connect (block 384). Alternatively, for each target computer that the penetration tester 100 can connect to, the attack and penetrate module 400 is initiated for that target computer (block 386). It should be noted that in accordance with the present embodiment of the invention, the attack and penetrate module 400 may be initiated for all target computers to which the penetration tester 100 may be connected, or just to select target computers.

Figure 9:
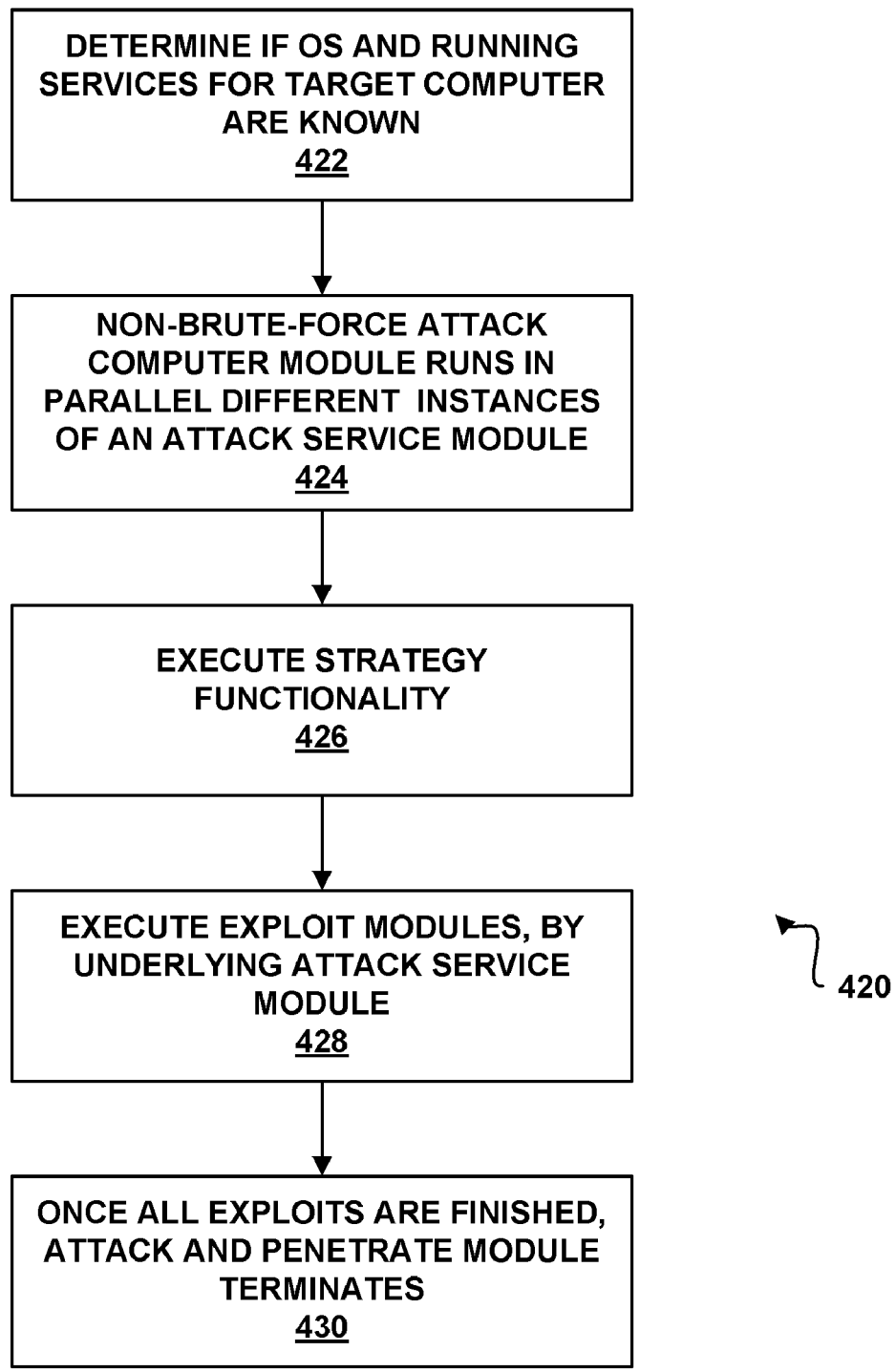
FIG. 9 is a flow chart illustrating steps taken by the attack and penetrate module of FIG. 7 when run against a single target computer.

FIG. 9 is a flow chart 420 illustrating steps taken by the attack and penetrate module 400 when run against a single target computer. In this example, in the configuration pane 350 of FIG. 7, the brute-force attacks option 354 is set to NO, the stop on first successful attack option 356 is set to NO, and the one-shot attacks option 358 is set to NO. On starting, the attack and penetrate module 400 checks whether it knows the OS and the running services for the target computer (block 422). The attack and penetrate module 400 cannot continue if these are not known. In fact, if the OS and running services are not known the penetration tester 100 may run the information gathering module 300 to obtain the OS and running services.

As shown by block 424, a non-brute-force attack computer module then runs in parallel different instances of an attack service module. That is, for each service that the target computer system is running (it is required to know the running services before executing this module), the penetration tester 100 will compute a list of exploit modules that can attack this service, order the exploit modules according to parameters stored in an internal database, and execute the exploit modules one by one. To order exploit modules, the attack service module executes strategy functionality (block 426), which may be provided by a strategy algorithm. The strategy algorithm underlying a given attack service instance, uses the OS and running services detected on the target computer to select attacks (i.e., exploit modules) against the underlying service.

For example, if the operating system for the target computer is Microsoft Windows Server 2003 Enterprise Edition and WINS service is answering in TCP/UDP port 42, then the strategy module will select the Microsoft Windows WINS Name Value Handling Remote Buffer Overflow which targets this combination of OS and service. Once all the exploits targeting this OS and service are selected, the strategy module will order the exploits according to other parameters (e.g., it might remove all of those that are "one-shot exploits" if one shot exploits are not supposed to run in this test; ultimately, it might look for the success probability parameter that is stored in an internal database to order them).

As shown by block 428, exploit modules are then executed, by the underlying attack service module, in that order. Once all of the exploits are finished, the attack and penetrate module terminates (block 430).

Figure 10:
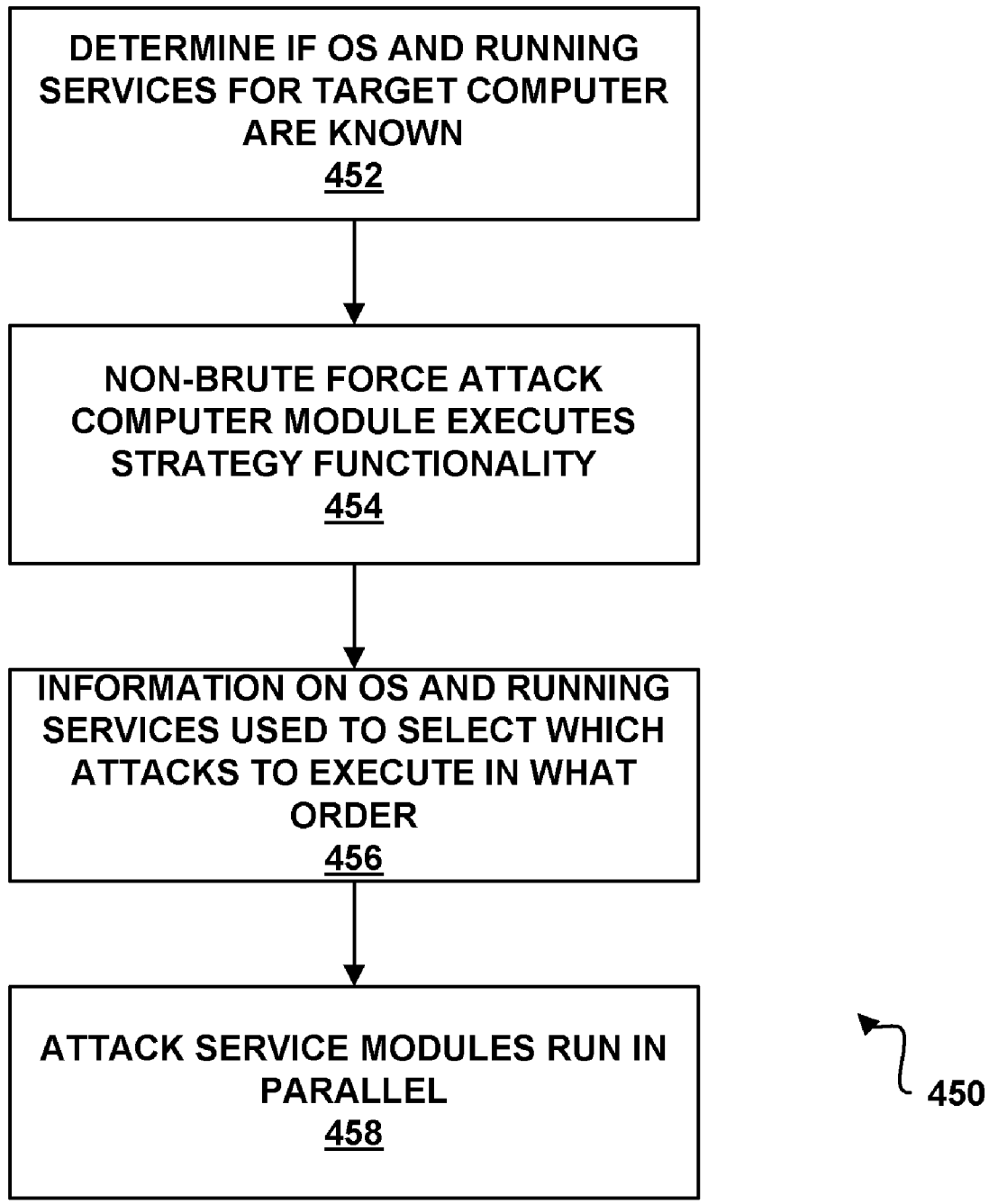
FIG. 10 is a flow chart illustrating steps taken by the attack and penetrate module of FIG. 7, when run against a single target computer, in accordance with a second example.

FIG. 10 is a flow chart 450 illustrating steps taken by the attack and penetrate module 400 when run against a single target computer, in accordance with another example. In this example, in the configuration pane 350 of FIG. 7, the brute-force attacks option 354 is set to YES, the stop on first successful attack option 356 is set to NO, and the one-shot attacks option 358 is set to YES.

On starting, the attack and penetrate module 400 checks whether it knows the OS and the running services of the target computer (block 452). The attack and penetrate module 400 cannot continue if these are not known. In fact, if the OS and running services are not known the penetration tester 100 may run the information gathering module 300 to obtain the OS and running services.

As shown by block 454, the non-brute-force attack computer module executes strategy functionality, which may be provided by a strategy algorithm. The strategy algorithm uses the information on the OS and the running services to select which attacks (i.e., exploits) it will execute and in what order (block 456). The strategy algorithm then executes the Attack Service modules in parallel (block 458).

The following further describes the local information gathering module 700 of the rapid penetration testing framework 160. The local information gathering module 700 runs in a compromised system (i.e., computer). When started, the local information gathering module 700 takes a screenshot and executes the email address and contact information gathering module. All this information is sent to the penetration tester 100.

The following further describes the network vulnerability test module 500 of the rapid penetration testing framework 160. This module combines the information gathering module 300, the attack and penetrate module 400, and the local information gathering module 700 as follows. As described, the network vulnerability test module 500 takes as input the data and options provided to the information gathering module 300 and the attack and penetrate module 400, both of which have been described above. When started, the network vulnerability test module 500 runs the information gathering module 300 until the information gathering module 300 is finished. Once this is done, the storage device 116 of the end-user computer 50 will be populated with information regarding certain computer systems (i.e., target computers). Next, the network vulnerability test module 500 will run the attack and penetrate module 400 with the previously defined input. The procedure for doing this has already been described above. Finally, for each compromised computer system, the network vulnerability test module 500 will run an instance of the local information gathering module 700.

The following further describes the network vulnerability scanner validator module 600 of the rapid penetration testing framework 160. As described, the network vulnerability scanner validator module 600 takes as input a report produced by a vulnerability scanner. This report will contain a list of IP addresses and vulnerabilities (e.g., as described by their Common Vulnerability and Exposure—CVE—number). When started, the network vulnerability scanner validator module 600 might execute the network information gathering module 300 to confirm some of the information provided in the report. In particular, if the OS and services for each of the IPs in the report is not provided, then the network vulnerability scanner validator module 600 will attempt to find them with the information gathering module 300. Next, for each pair of IP address and vulnerability, the network vulnerability scanner validator module 600 runs the exploit underlying this vulnerability against the pairing IP in order to confirm that the vulnerability is present.

All tested vulnerabilities and the results are annotated for constructing a report. The first time that a computer hosted in a given IP is compromised, the network vulnerability scanner validator module 600 executes the local information gathering module 700. The network vulnerability scanner validator module 600 ends once all the vulnerabilities have been tested.

The abovementioned provides multiple ways that the penetration tester 100 may obtain assets that could be valuable to an end-user testing vulnerability of target computers. The results of the abovementioned tests are assets, where assets can represent anything that an attacker may need to obtain during the course of a computer attack. More precisely, assets represent the knowledge that an end-user has verified a property over a real object or of the network. For example, knowing that there is a computer system connected at a given IP address, or what OS is this computer system running, are assets. In addition, compromising one such computer system is a further asset. These assets, or more precisely knowing which assets can be obtained during a security audit, may then be used to determine what steps need to be performed to prevent an actual end-user attack on a target computer.

The functionalities of the different embodiments of this invention are geared at obtaining assets. Those in the so-called client-side embodiments are information gathering modules which help to obtain assets necessary to compromise workstations. For example, an end-user performing the penetration test could first test what are all the valid email addresses for an organization, find what version of a Web processor runs in these workstations, he may be able to detect what vulnerabilities are present in the system, plan how to compromise this vulnerability and handpick an exploit module that compromises this workstation. It is customary in the art, to prepare an email that appears to be from a distinguished employee of the organization being tested with some text and an attachment in order to entice the recipient of the email to open the attachment (and thus get his workstation automatically compromised). The client-side penetration test framework underlying this invention allows its end-user to iteratively get hold of the assets required to complete the test (i.e., fulfilling the steps of information gathering, information analysis and planning, vulnerability detection, compromise, analysis, and reporting). In particular, the present framework can be used to send the said emails to the valid email addresses, compromise these workstations, and continue with the security audit, e.g., make local information gathering in these workstations or install an agent and pivot to other computer systems connected to the same LAN as this workstation.

In a similar way, the RPT modules are able to achieve certain groups of assets for a given set of targets. Say, the information gathering RPT module will achieve as much information assets as possible for the list of IP addresses provided as input, the network vulnerability test RPT module will achieve as much compromise assets as possible for the list of IP addresses provided as input.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for performing penetration testing in a network from an end-user computer, wherein the method comprises the steps of:
    gathering valid email addresses from a server;
    transmitting at least one determination email, wherein the determination email contains computer code, to at least one of the gathered email addresses, wherein the determination email is transmitted to a target computer associated with the at least one gathered email address, and wherein the determination email determines at least one application running on the target computer using the computer code of the determination email;
    determining, by use of the determination email, at least one application running on the target computer, by the determination email containing a placeholder for content hosted in a server controlled by the penetration tester, wherein the at least one application is used to load the content in the placeholder in the target computer, thereby identifying the at least one application;
    determining at least one vulnerability of the at least one determined application running on the target computer; and
    generating at least one exploit for exploiting the determined at least one vulnerability of the application, thereby allowing for compromising of the target computer.

2. The method of claim 1, wherein the step of gathering valid email addresses further comprises the step of interacting with a simple mail transfer protocol (SMTP) server to detect email addresses that the SMTP server hosts.

3. The method of claim 1, further comprising the step of transmitting the generated at least one exploit to the target computer to gain control over the target computer.

4. The method of claim 1, further comprising the step of transmitting an email having access to the at least one exploit to the target computer to gain control over the target computer.

5. The method of claim 1, further comprising the step of transmitting the generated at least one exploit to the target computer to gain control over the determined applications.

6. The method of claim 1, wherein the at least one determined application is selected from the group consisting of a Web browser and an email client.

7. A system for providing network penetration testing, comprising:
    a first module implemented via hardware logic circuitry configured to gather valid email addresses from a server;
    a second module implemented via hardware logic circuitry configured to transmit at least one determination email containing computer code to at least one of the gathered email addresses, wherein the determination email is transmitted to a target computer associated with the at least one gathered email address, and wherein the determination email determines at least one application running on the target computer using the computer code of the determination email;

a third module implemented via hardware logic circuitry configured to determine, by use of the determination email, at least one application running on the target computer, by the determination email containing a placeholder for content hosted in a server controlled by a penetration tester, wherein the at least one application is used to load the content in the placeholder in the target computer, thereby identifying the at least one application;

a fourth module implemented via hardware logic circuitry configured to determine at least one vulnerability of the at least one determined application running on the target computer; and a fifth module implemented via hardware logic circuitry configured to generate at least one exploit for exploiting the determined at least one vulnerability of the application, thereby allowing for compromising of the target computer.

8. The system of claim 7, further comprising a sixth module implemented via hardware logic circuitry for browsing a Web page tree, detecting email addresses on the Web page tree, and storing the detected email addresses.

9. The system of claim 7, wherein the first module is configured to interact with a simple mail transfer protocol (SMTP) server to detect email addresses that the SMTP server hosts.

10. The system of claim 7, further comprising a sixth module implemented via hardware logic circuitry for transmitting the generated at least one exploit to the target computer to gain control over the target computer.

11. The system of claim 7, further comprising a sixth module implemented via hardware logic circuitry for transmitting an email having access to the at least one exploit to the target computer to gain control over the target computer.

12. The system of claim 7, further comprising a sixth module implemented via hardware logic circuitry for transmitting the generated at least one exploit to the target computer to gain control over the determined applications.

13. A non-transitory computer readable medium having a program for providing network penetration testing within a network, the program configured to perform the steps of:

gathering valid email addresses from a server;

transmitting at least one determination email containing computer code to at least one of the gathered email addresses, wherein the determination email is transmitted to a target computer associated with the at least one gathered email address, and wherein the determination email determines at least one application running on the target computer using the computer code of the determination email;

determining, by use of the determination email, at least one application running on the target computer, by the determination email containing a placeholder for content hosted in a server controlled by the penetration tester, wherein the at least one application is used to load the content in the placeholder in the target computer, thereby identifying the at least one application;

determining at least one vulnerability of the at least one determined application running on the target computer; and generating at least one exploit for exploiting the determined at least one vulnerability of the application, thereby allowing for compromising of the target computer.

* * * * *